US012670487B2

(12) United States Patent　　(10) Patent No.:　US 12,670,487 B2
Gotanda　　(45) Date of Patent:　Jun. 30, 2026

(54) TRANSACTION PROCESSING SYSTEM, METHOD PERFORMED BY INFORMATION PROCESSING SYSTEM, AND INFORMATION PROCESSING DEVICE

(71) Applicant: Toshiba Tec Kabushiki Kaisha, Tokyo (JP)

(72) Inventor: Tsuyoshi Gotanda, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 90 days.

(21) Appl. No.: 18/472,151

(22) Filed: Sep. 21, 2023

(65) Prior Publication Data

US 2024/0211919 A1　　Jun. 27, 2024

(30) Foreign Application Priority Data

Dec. 23, 2022　(JP) ................................. 2022-206499

(51) Int. Cl.
*G06Q 20/08*　　(2012.01)
*G06Q 20/20*　　(2012.01)

(52) U.S. Cl.
CPC ......... *G06Q 20/208* (2013.01); *G06Q 20/202* (2013.01); *G06Q 20/206* (2013.01)

(58) Field of Classification Search
CPC .. G06Q 20/208; G06Q 20/202; G06Q 20/206; G06Q 10/087; G07G 1/0081; G07G 1/14
See application file for complete search history.

(56) References Cited

U.S. PATENT DOCUMENTS

2019/0118844 A1* 4/2019 Li ......................... G07G 1/0081
2019/0279185 A1* 9/2019 Cheng ................... B62B 5/0096

FOREIGN PATENT DOCUMENTS

JP　　2006085274 A　*　3/2006
JP　　2016-170574 A　　9/2016

OTHER PUBLICATIONS

Japanese Office Action dated Dec. 16, 2025, mailed in counterpart Japanese Application No. 2022-206499, 6 pages (with translation).

* cited by examiner

*Primary Examiner* — Ariel J Yu
*Assistant Examiner* — Denisse Y Ortiz Roman
(74) *Attorney, Agent, or Firm* — Kim & Stewart LLP

(57) ABSTRACT

A transaction processing system includes a cart terminal attachable to a shopping cart on which a basket can be placed, the cart terminal being configured to register one or more merchandise items for purchase, and a transaction processing device configured to acquire information indicating at least a size of each of the registered merchandise items, determine a degree of occupancy of the registered merchandise items in the basket using the acquired information, and output the determined degree of occupancy.

18 Claims, 8 Drawing Sheets

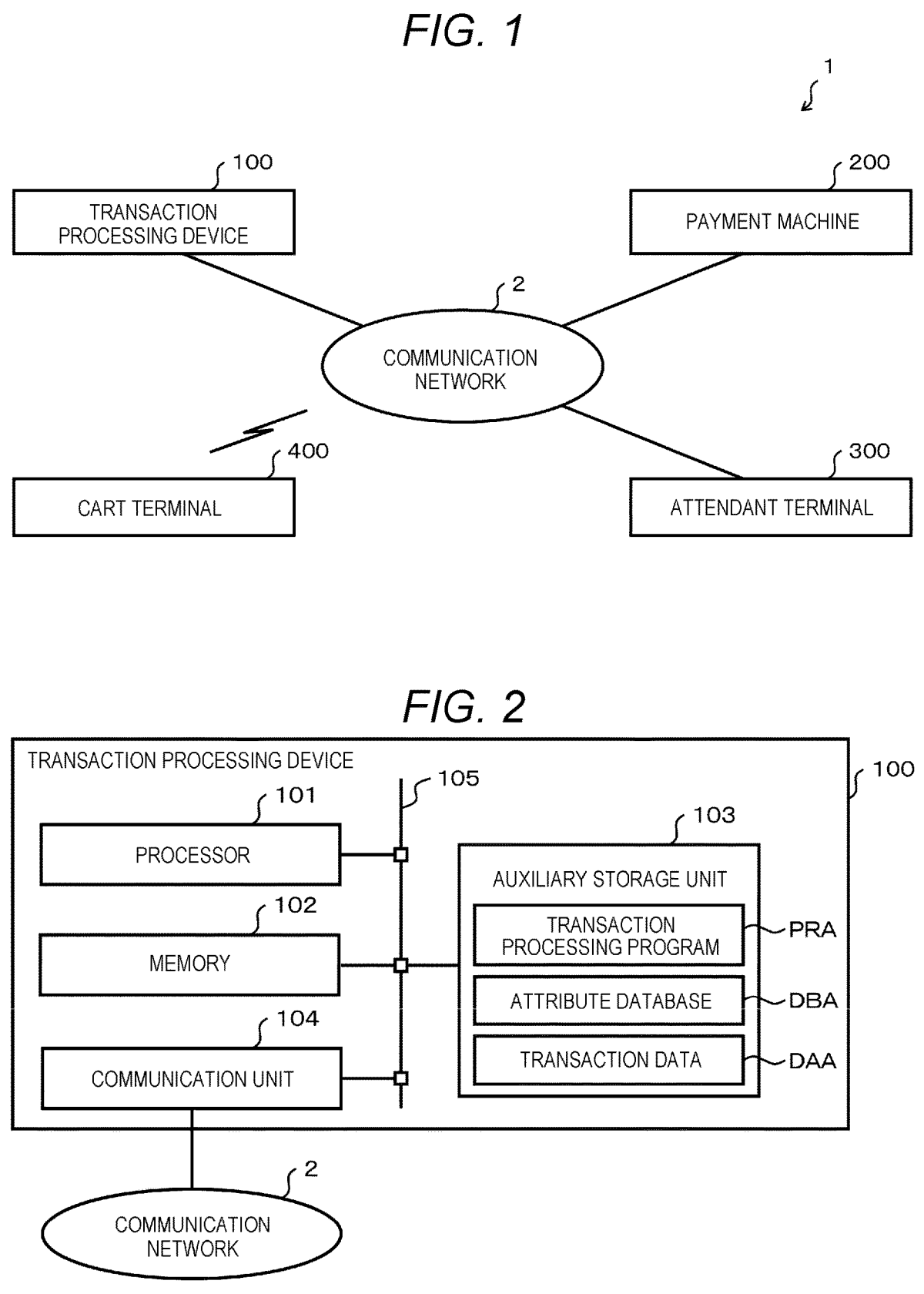

TRANSACTION PROCESSING DEVICE ~100

PAYMENT MACHINE ~200

COMMUNICATION NETWORK ~2

CART TERMINAL ~400

ATTENDANT TERMINAL ~300

FIG. 2

TRANSACTION PROCESSING DEVICE ~100

PROCESSOR ~101

MEMORY ~102

COMMUNICATION UNIT ~104

~105

AUXILIARY STORAGE UNIT ~103

TRANSACTION PROCESSING PROGRAM ~PRA

ATTRIBUTE DATABASE ~DBA

TRANSACTION DATA ~DAA

COMMUNICATION NETWORK ~2

REA

| | |
|---|---|
| MERCHANDISE CODE | ~FAA |
| MERCHANDISE NAME | ~FAB |
| WIDTH | ~FAC |
| DEPTH | ~FAD |
| HEIGHT | ~FAE |
| TEMPERATURE ZONE | ~FAF |
| HARDNESS AND SOFTNESS | ~FAG |
| EXCLUSION FLAG | ~FAH |

DAA

| | |
|---|---|
| TRANSACTION CODE | ~FBA |
| TERMINAL CODE | ~FBB |
| CUSTOMER CODE | ~FBC |
| MERCHANDISE DATA | ~FBD |
| MERCHANDISE DATA | ~FBE |

TRANSACTION PROCESSING SYSTEM, METHOD PERFORMED BY INFORMATION PROCESSING SYSTEM, AND INFORMATION PROCESSING DEVICE

CROSS-REFERENCE TO RELATED APPLICATION

This application is based upon and claims the benefit of priority from Japanese Patent Application No. 2022-206499, filed on Dec. 23, 2022, the entire contents of which are incorporated herein by reference.

FIELD

Embodiments described herein relate generally to a transaction processing system, a method performed by a transaction processing system, and a transaction processing device.

BACKGROUND

There is a system for performing transaction processing using, as a user interface, an information communication terminal operated by a customer such as a smartphone or an information communication terminal lent to the customer from a store or the like. There is another transaction processing system using, as the user interface for the customer, an information communication terminal attached to a shopping cart provided in the store.

In such transaction processing systems, an operation for registering a merchandise item for purchase is performed by the customer at any place in the store. Therefore, even if the registration of the merchandise item is not appropriately performed due to an erroneous operation, the customer or a store clerk may not notice the inappropriate registration.

SUMMARY OF THE INVENTION

Embodiments of the present invention provide a transaction processing system, a method performed by a transaction processing system, and a transaction processing device capable of preventing an erroneous operation performed by a customer from not being addressed.

According to an embodiment, a transaction processing system comprises a cart terminal attachable to a shopping cart on which a basket can be placed, the cart terminal being configured to register one or more merchandise items for purchase; and a transaction processing device configured to: acquire information indicating at least a size of each of the registered merchandise items, determine a degree of occupancy of the registered merchandise items in the basket using the acquired information, and output the determined degree of occupancy.

BRIEF DESCRIPTION OF THE DRAWINGS

FIG. 1 is a schematic block diagram of a transaction processing system according to an embodiment.
FIG. 2 is a hardware block diagram of a transaction processing device according to an embodiment.

DETAILED DESCRIPTION

Figure 3:
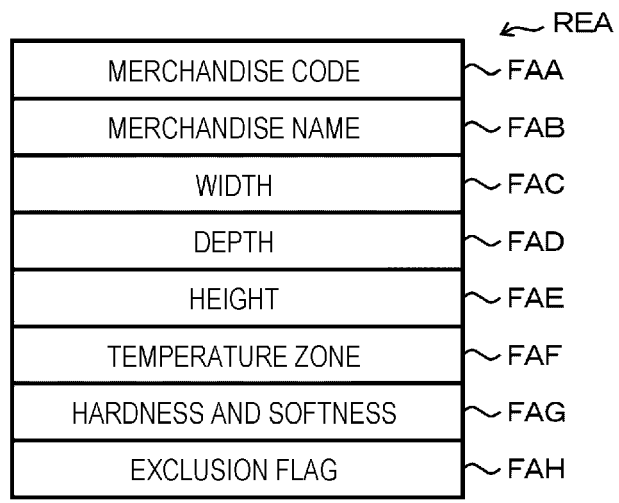
FIG. 3 depicts a data structure of one data record included in an attribute database.

Hereinafter, embodiments will be described with reference to the drawings.

FIG. 1 is a schematic block diagram of a transaction processing system 1 according to an embodiment. The transaction processing system 1 comprises a transaction processing device 100, a payment machine 200, an attendant terminal 300, and a cart terminal 400 that can communicate with one another via a communication network 2. Any number of each of the transaction processing device 100, the payment machine 200, the attendant terminal 300, and the cart terminal 400 may be included in the transaction processing system 1, and only one transaction processing device 100, one payment machine 200, one attendant terminal 300, and one cart terminal 400 are shown in FIG. 1.

The Internet, a virtual private network (VPN), a local area network (LAN), a public communication network, a mobile communication network, and the like can be used alone or in appropriate combination as the communication network 2. For example, the Internet and the mobile communication network are used in combination as the communication network 2.

In a store in which the payment machine 200 and the cart terminal 400 can be used as user interface terminals by a customer, the transaction processing device 100 performs information processing for providing a transaction processing service for processing a merchandise sales transaction between the customer and the store according to an operation performed by the customer in the store. The transaction processing device 100 is implemented as, for example, a cloud server, and provides the transaction processing service in a plurality of stores. The transaction processing device 100 may be implemented as, for example, a local server, and may provide the transaction processing service only in one store.

The payment machine 200 is provided in the store and executes payment processing related to payment of a transaction processed by the transaction processing device 100. The payment machine 200 receives an operation by an operator during the payment processing. The operator of the payment machine 200 is mainly the customer. A store clerk may also be the operator of the payment machine 200.

The attendant terminal 300 is an information processing terminal operated by the store clerk as a supervisor who monitors a use situation of the transaction processing system 1. The store clerk is referred to as an attendant. The attendant terminal 300 is a terminal device for a user interface related to information processing for supporting work of the attendant related to the transaction processed by the transaction processing system 1. For example, the work of the attendant includes monitoring an execution situation of the transaction being processed and appropriately supporting the customer.

The cart terminal 400 is an information processing terminal attached to a shopping cart (hereinafter, referred to as a cart) provided in the store. The cart terminal 400 is lent to a customer together with the cart. The cart terminal 400 is a terminal device that receives an operation performed by the customer for the transaction processing in the transaction processing device 100. The cart terminal 400 may include an information communication terminal that is lent from the store to the customer and carried for use by the customer.

FIG. 2 is a hardware block diagram of the transaction processing device 100. The transaction processing device 100 includes a processor 101, a memory 102, an auxiliary storage unit 103, a communication unit 104, and a bus 105. The processor 101, the memory 102, the auxiliary storage unit 103, and the communication unit 104 can communicate with one another via the bus 105.

The processor 101, the memory 102, and the auxiliary storage unit 103 are connected to one another by the bus 105, thereby implementing a controller that performs information processing for controlling the transaction processing device 100.

The processor 101 executes the information processing for performing various functions of the transaction processing device 100 according to an operating system and programs such as application programs.

The memory 102 includes a read-only memory area and a rewritable memory area. The read-only memory area of the memory 102 stores a part of the programs. The read-only memory area and the rewriteable memory area of the memory 102 may store data necessary for the processor 101 to execute processing for controlling the components of the transaction processing device 100. The rewritable memory area of the memory 102 is also used as a work area for the processor 101.

The auxiliary storage unit 103 is a storage device of the transaction processing device 100. As the auxiliary storage unit 103, for example, an electric erasable programmable read-only memory (EEPROM), a hard disc drive (HDD), a solid state drive (SSD), or various other well-known storage devices can be used. The auxiliary storage unit 103 stores data used by the processor 101 to perform various kinds of processing and data generated by the processing executed by the processor 101. The auxiliary storage unit 103 may store programs. In an embodiment, the auxiliary storage unit 103 stores a transaction processing program PRA, which is one of the programs. The transaction processing program PRA is an application program described in a procedure of information processing (hereinafter, referred to as transaction processing) for registration of a merchandise item that is a transaction target (hereinafter, referred to as transaction merchandise item) and settlement of a price of the registered transaction merchandise item. The auxiliary storage unit 103 further stores an attribute database DBA and transaction data DAA. The attribute database DBA is a database that relates each kind of merchandise item that can be registered as a transaction merchandise item to the attributes thereof. The transaction data DAA is data indicating a content of one transaction.

The communication unit 104 is a network interface circuit that executes communication processing for data communication via the communication network 2. As the communication unit 104, for example, an existing wired communication device for the Internet can be used. As the communication unit 104, instead of or in addition to the wired communication device, a wireless communication device connected to the communication network 2 by wireless communication may be used.

The bus 105 includes an address bus, a data bus, a control signal line, and the like, and transmits data and control signals transmitted and received among connected units.

FIG. 3 depicts one data record REA of the attribute database DBA. The attribute database DBA is a set of data records REA each associated with a merchandise item. The data record REA includes fields FAA, FAB, FAC, FAD, FAE, FAF, FAG, and FAH. In the field FAA, a merchandise code as an identifier of an associated merchandise item is set. In the field FAB, the merchandise name of the associated merchandise item is set. In the field FAC, a width of the associated merchandise item is set. In the field FAD, a depth of the associated merchandise item is set. In the field FAE, a height of the associated merchandise is set. The data set in the fields FAC, FAD, and FAE are, for example, numerical values in units of millimeter. The width, the depth, and the height of a merchandise item may be appropriately set by, for example, a store operator. In the case of a merchandise item having a variation in size, for example, representative values determined within a range of the variation are set in the fields FAC, FAD, and FAE. The representative value is, for example, an average value or a maximum value, and what representative value is to be adopted may be appropriately determined by, for example, the store operator.

In the field FAF, a temperature zone related to the associated merchandise item is set. The field FAF stores, for example, data for identifying "normal temperature", "refrigerated", "frozen" and "high temperature". In the field FAG, data indicating whether the associated merchandise item is "hard", "soft" or other attributes is set. In the field FAG, an exclusion flag indicating whether the associated merchandise item is excluded from a target of occupancy volume calculation to be described later is set. The exclusion flag is enabled for a merchandise item that is not normally put into a shopping basket, such as large merchandise item. Thus, each data set in the fields FAC, FAD, FAE, FAF, FAG, and FAH indicates an attribute related to the merchandise item identified by the fields FAA and FAB.

One or more of the above-described fields may be omitted from the data record REA. Moreover, a field in which another piece of data related to an attribute such as a weight is set may be added to the data record REA.

If the transaction processing device 100 provides the transaction processing service in a plurality of stores, the auxiliary storage unit 103 may store a plurality of attribute databases DBA associated with the corresponding stores. Further, if the plurality of stores include stores belonging to a plurality of companies, the auxiliary storage unit 103 may store a plurality of attribute databases DBA associated with the corresponding companies. The attribute database DBA is developed by an appropriate developer before start of provision of the transaction processing service, and is stored in the auxiliary storage unit 103 according to an instruction from an appropriate operator. The attribute database DBA is updated according to the instruction from the appropriate operator when there is a change in the merchandise item.

Figure 4:
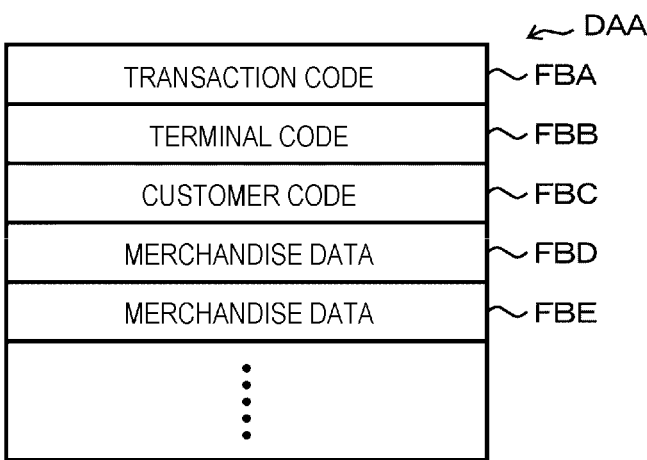
FIG. 4 depicts a data structure of transaction data.

FIG. 4 depicts a data structure of the transaction data DAA. The transaction data DAA is generated for each transaction being processed in the transaction processing device 100 and is stored in the auxiliary storage unit 103. Thus, the auxiliary storage unit 103 may store no transaction data DAA, and the auxiliary storage unit 103 may simultaneously store a plurality of pieces of transaction data DAA.

The transaction data DAA includes fields FBA, FBB, and FBC. The transaction data DAA may include any number of fields after a field FBD. In the field FBA, a transaction code as an identifier of the transaction is set. In the field FBB, a terminal code as an identifier of the cart terminal 400 used by the customer who performs the transaction is set. In the field FBC, a customer code as an identifier of the customer who performs the transaction is set. If there are one or more registered merchandise items as transaction merchandise items, fields FBD, FBE, and so on associated with the corresponding transaction merchandise items are added to the transaction data DAA. In the fields FBD, FBE, and so on, merchandise data related to different kinds of transaction merchandise items are set. Each merchandise data includes the merchandise code and the quantity of the transaction merchandise item. The merchandise data may include various other information such as the merchandise name, unit price, and discount information thereof.

Transfer of the transaction processing device 100 is generally performed in a state in which the transaction processing program PRA is stored in the auxiliary storage unit 103 and the attribute database DBA and the transaction data DAA are not stored in the auxiliary storage unit 103. However, the hardware in a state in which the transaction processing program PRA is not stored in the auxiliary storage unit 103 or in a state in which an application program having the same type but a different version from the PRA is stored in the auxiliary storage unit 103, and the transaction processing program PRA may be individually transferred. The transaction processing program PRA may be stored in the auxiliary storage unit 103 according to an operation of any operator. Transfer of the transaction processing program PRA can be performed by recording the transaction processing program PRA on a non-transitory computer readable recording medium such as a magnetic disk, a magneto-optical disk, an optical disk, or a semiconductor memory, or by communication via a network.

Figure 5:
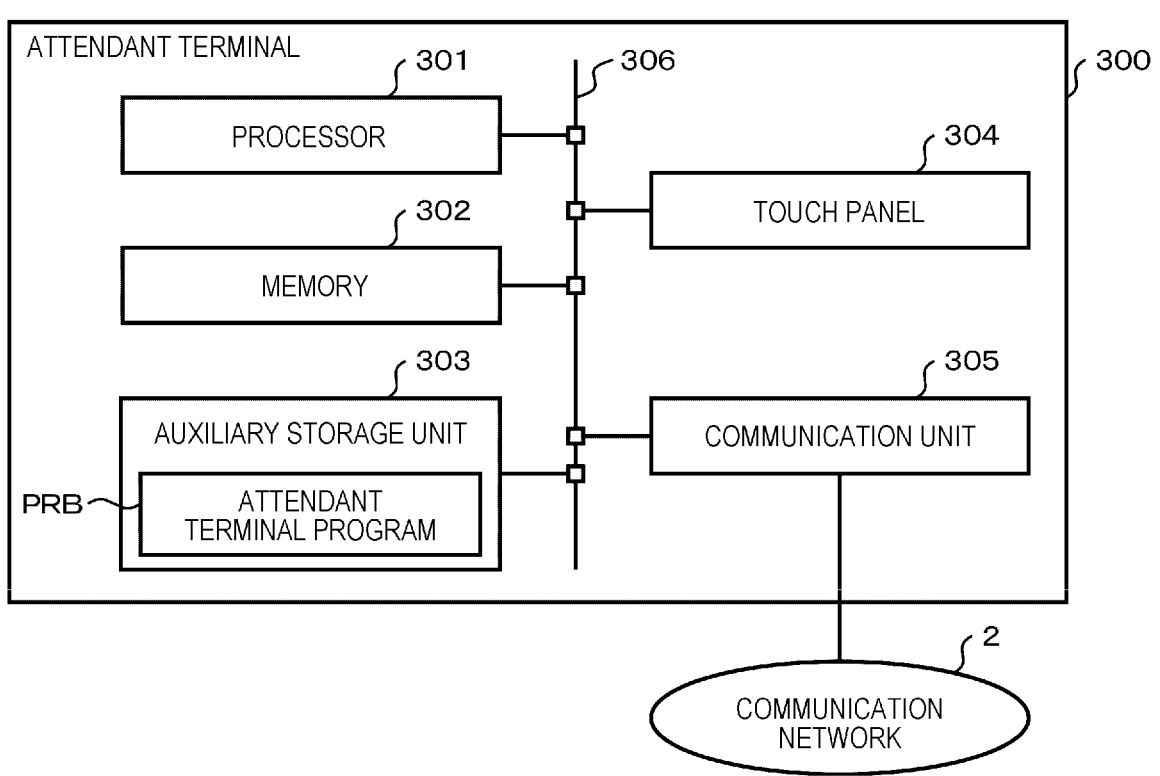
FIG. 5 is a hardware block diagram of an attendant terminal according to an embodiment.

FIG. 5 is a hardware block diagram of the attendant terminal 300. The attendant terminal 300 includes a processor 301, a memory 302, an auxiliary storage unit 303, a touch panel 304, a communication unit 305, and a bus 306.

Functions of the processor 301, the memory 302, the auxiliary storage unit 303, the communication unit 305, and the bus 306 are substantially the same as those of the processor 101, the memory 102, the auxiliary storage unit 103, and the bus 105, and thus descriptions thereof will be omitted. However, the auxiliary storage unit 303 stores an attendant terminal program PRB instead of the transaction processing program PRA. The attendant terminal program PRB is an application program executed by the processor 301 for causing the attendant terminal 300 to operate as a user interface for the store clerk who monitors the transaction processed by the transaction processing device 100.

The touch panel 304 displays a screen for presenting information to the operator of the attendant terminal 300. The touch panel 304 accepts an input of an instruction by a touch operation on the screen performed by the operator.

As hardware of the attendant terminal 300, for example, a stationary computer device is used. As the hardware of the attendant terminal 300, a tablet device or a portable device such as a smartphone may be used.

Figure 6:
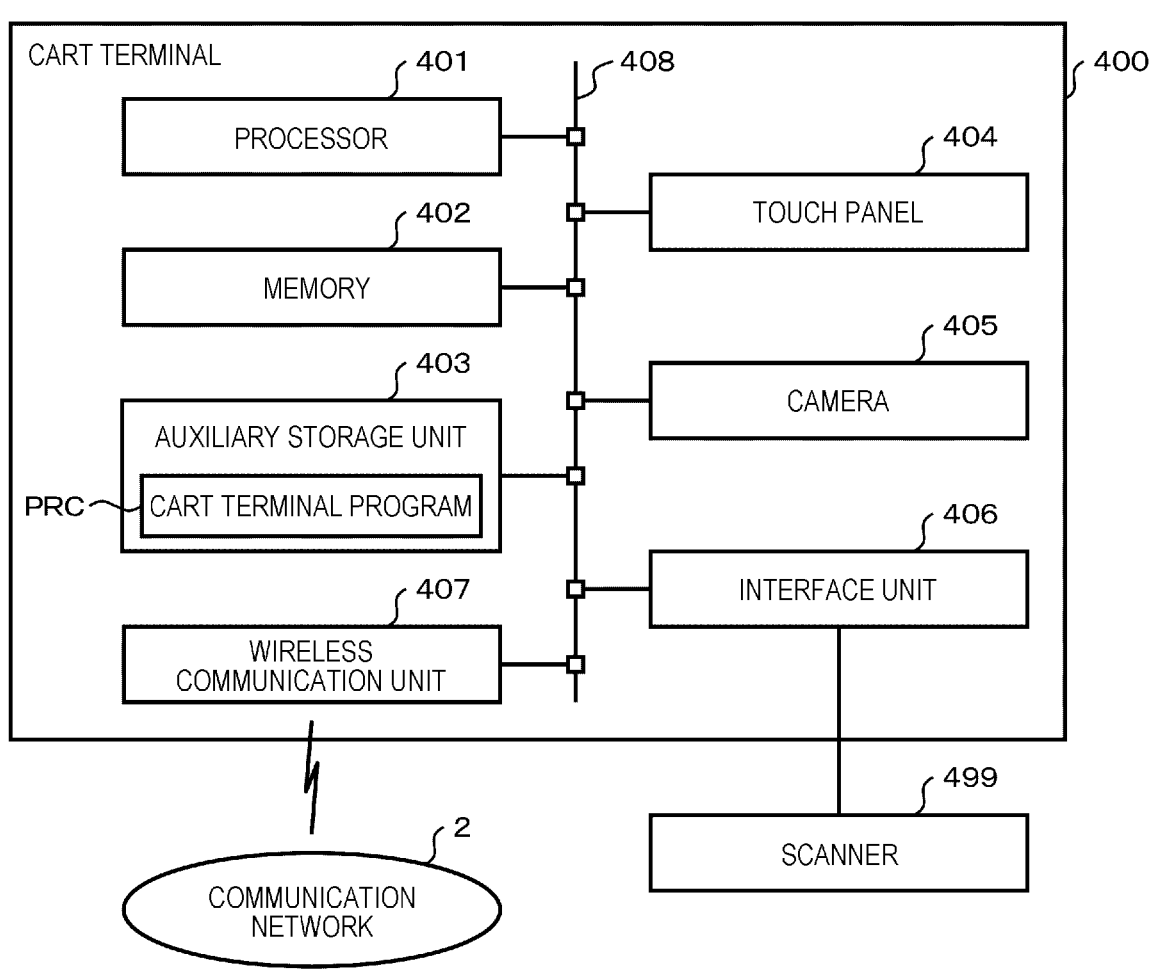
FIG. 6 is a hardware block diagram of a cart terminal according to an embodiment.

FIG. 6 is a hardware block diagram of the cart terminal 400. The cart terminal 400 includes a processor 401, a memory 402, an auxiliary storage unit 403, a touch panel 404, a camera 405, an interface unit 406, a wireless communication unit 407, and a bus 408.

Functions of the processor 401, the memory 402, the auxiliary storage unit 403, and the bus 408 are substantially the same as functions of the processor 101, the memory 102, the auxiliary storage unit 103, and the bus 105. The function of the touch panel 404 is substantially the same as that of the touch panel 304. However, the auxiliary storage unit 403 stores a cart terminal program PRC instead of the transaction processing program PRA. The cart terminal program PRC is an application program executed by the processor 401 for causing the cart terminal 400 to operate as a user interface for the transaction processing performed by the transaction processing device 100. The camera 405 includes an image sensor that captures an image of an object within an imaging range including an entire internal space of a shopping basket placed in the cart.

An external device such as a scanner is connected to the interface unit 406. The interface unit 406 is an interface circuit for exchanging data with the external device connected thereto. As the interface unit 406, an existing universal serial bus (USB) controller can be used. The scanner is attached to the cart and optically scans a one-dimensional bar code, a two-dimensional bar code, and the like.

The wireless communication unit 407 executes communication processing for wirelessly performing data communication via the communication network 2. As the wireless communication unit 407, for example, an existing wireless communication device for a wireless LAN can be used. Instead of or in addition to the wireless communication unit 407, a communication unit connected to the communication network 2 by wire may be used. As basic hardware of the cart terminal 400, for example, hardware of a tablet-type device is used.

Next, an operation of the transaction processing system 1 having the above configurations will be described. Various kinds of processing described below are merely examples, and change of the order of certain processing, omission of certain processing, addition of another processing, and the like are possible as appropriate. For example, in the following description, for easy understanding of a characteristic operation, description of a part of the processing is omitted. For example, if an error occurs, processing for coping with the error may be performed, and a description of such processing is omitted.

A customer performs a predetermined operation for starting using a cart terminal 400 that is available in a store. The customer can also perform a predetermined operation for inputting the customer code to the cart terminal 400 as a part of the operation for starting using the cart terminal 400. In the cart terminal 400 that receives such an operation, the processor 401 requests the transaction processing device 100 to check in. That is, for example, the processor 401 controls the wireless communication unit 407 to transmit request data for requesting the check-in to the transaction processing device 100 via the communication network 2. The processor 401 includes check-in data stored in the auxiliary storage unit 403 and a terminal code of the cart terminal 400 in the request data. The terminal code is previously assigned to the cart terminal 400 such that the cart terminal 400 is distinguishable from other cart terminals 400, and is stored in, for example, the auxiliary storage unit 403. If the processor 401 acquires the customer code, the customer code is also included in the request data. The check-in data includes at least information for identifying the store in which the cart terminal 400 is used. The information is, for example, a store code defined as a store identifier. The information may be, for example, a company code for identifying a company if it is not necessary to distinguish a plurality of stores operated by the same company. The information includes, for example, the company code and the store code if the same store code can be used by different companies.

If the check-in data is transmitted to the transaction processing device 100 via the communication network 2, in the transaction processing device 100, the communication unit 104 receives the check-in data and temporarily stores the check-in data in the memory 102 or the auxiliary storage unit 103.

In this way, if the check-in data transmitted from the cart terminal 400 is received by the transaction processing device 100, the processor 101 starts the transaction processing related to one transaction according to the transaction processing program PRA.

If the processor 101 is already executing the transaction processing for another transaction related to a different customer, the processor 101 starts new transaction processing in a thread different from that of the transaction processing. That is, the processor 101 may execute a plurality of transaction processing in parallel. However, in the following description, only processing on a transaction for one customer is described for illustration purpose. Thus, the "cart terminal 400" to be described below indicates one cart terminal 400 used by the customer for the transaction processing. In addition, the "transaction" in the following description indicates a transaction that is being executed for that customer.

Figure 7:
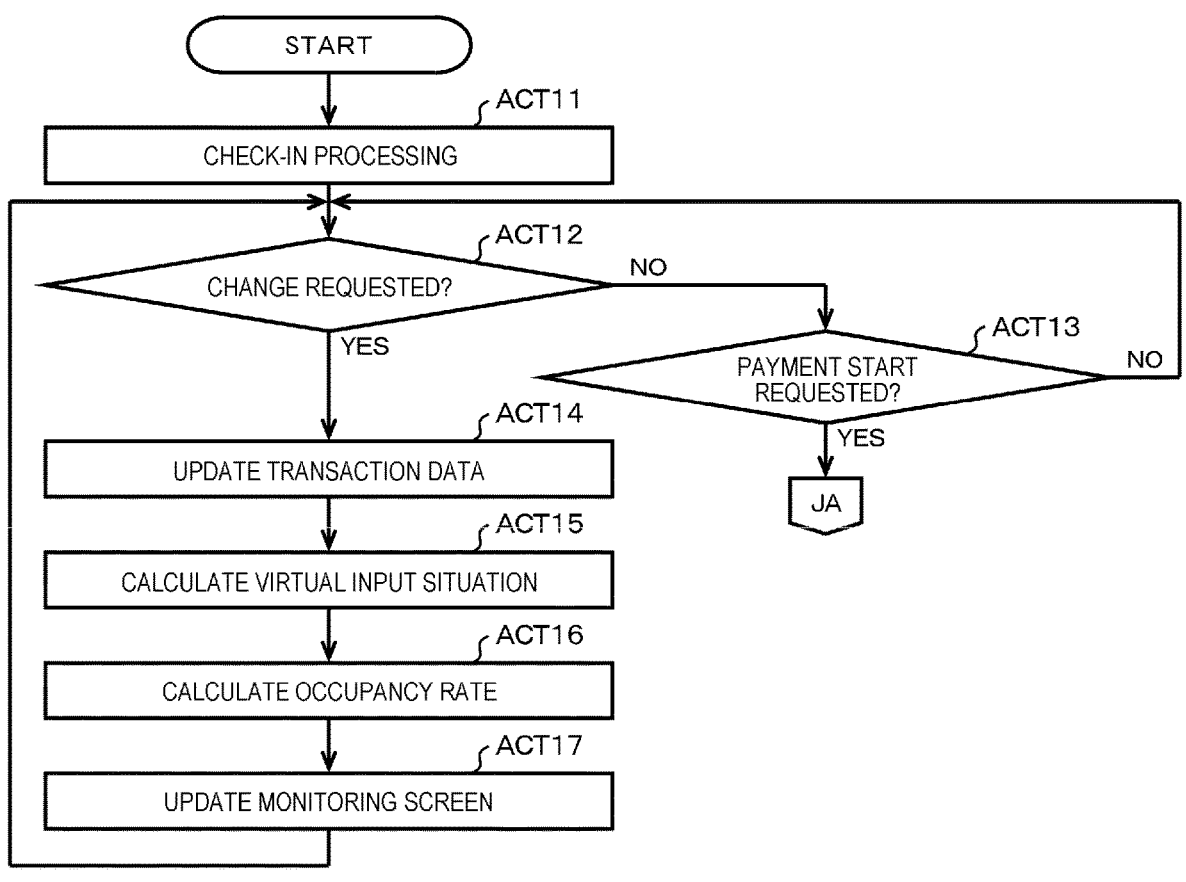
FIGS. 7 and 8 are flowcharts of transaction processing.
Figure 8:
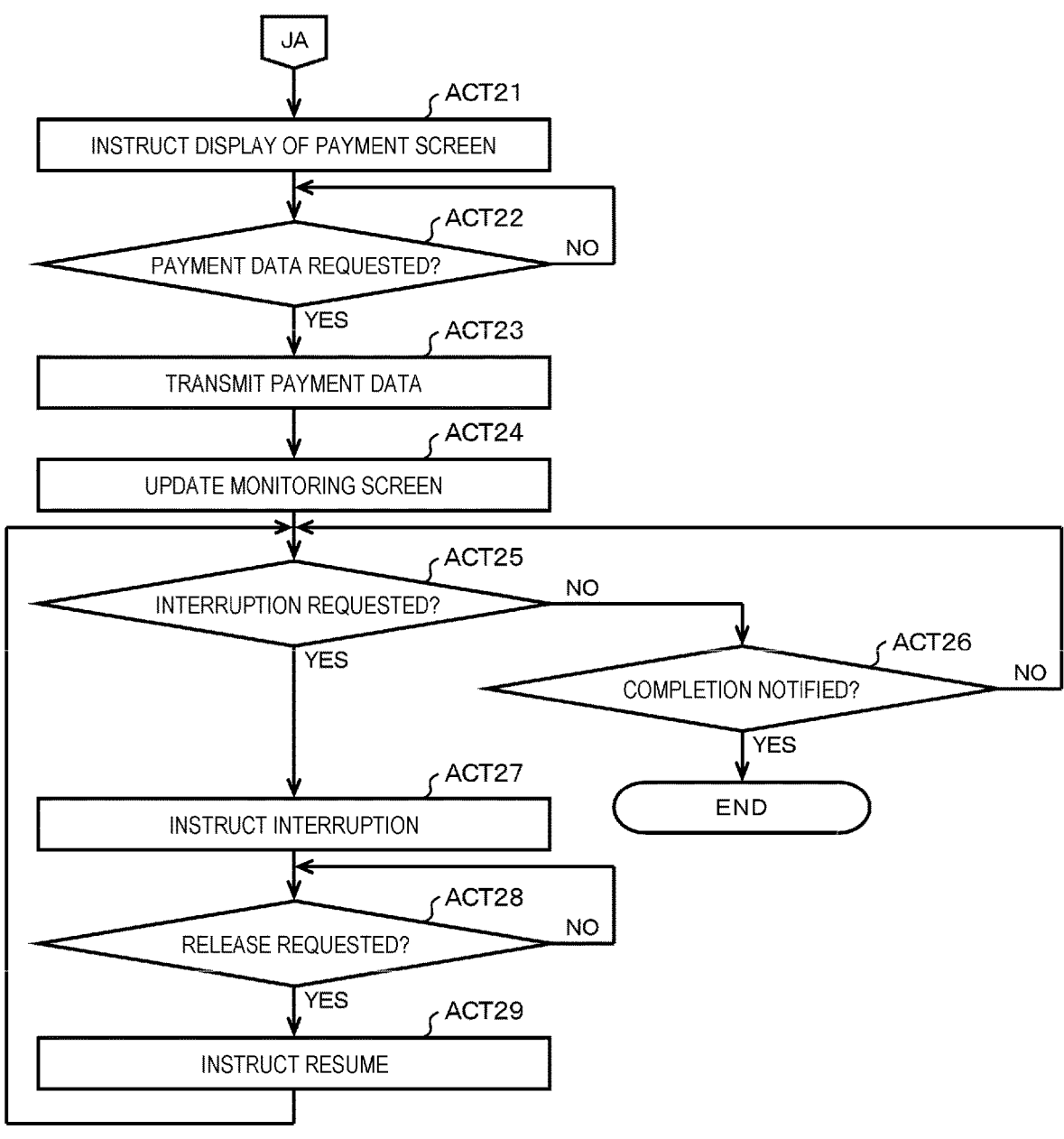

FIGS. 7 and 8 are flowcharts of the transaction processing executed by the processor 101.

In ACT 11 in FIG. 7, the processor 101 performs check-in processing. For example, the processor 101 checks a condition under which a transaction to be started is performed based on the check-in data received as described above, then processes the transaction, and executes predetermined processing for management. The check-in processing may be, for example, processing similar to that performed in an existing cart point of sale (POS) service. The processor 101 generates new transaction data DAA related to a target transaction in the check-in processing. That is, for example, the processor 101 determines, according to a predetermined rule, a new transaction code different from the transaction codes for identifying the other transactions, generates the new transaction data DAA in which the transaction code is set in the field FBA and the terminal code included in the request data is set in the field FBB, and stores the new transaction data DAA in the auxiliary storage unit 103. If the customer code is included in the request data, the processor 101 sets the customer code in the field FBC of the newly generated transaction data DAA. If the customer code is not included in the request data, the processor 101 sets the field FBC of the newly generated transaction data DAA to, for example, a null state. Since no transaction merchandise item has been registered, the processor 101 does not include any merchandise data in the newly generated transaction data DAA.

The customer searches for a merchandise item to be purchased in the store. Then, when the customer registers a merchandise item as a new transaction merchandise item, the customer performs a predetermined operation on the cart terminal 400 for designating the merchandise item. The operation is, for example, an operation for causing the scanner 499 to scan the bar code attached to the merchandise item and indicating its merchandise code such as a Japanese article number (JAN) code. The operation is, for example, an operation of tapping a preset button displayed on a display screen of the touch panel 404 and associated with the merchandise item. The operation is, for example, an operation of directly inputting the merchandise code through the touch panel 404. The customer can increase or decrease the quantity of the registered transaction merchandise item by performing a predetermined operation on the cart terminal 400 for instructing a quantity change of the transaction merchandise item. The customer can cancel the purchase of the registered transaction merchandise item by performing a predetermined operation on the cart terminal 400 for instructing cancellation of the transaction merchandise item. According to such an operation, the processor 401 in the cart terminal 400 requests the transaction processing device 100 to change a transaction content, along with the merchandise code and notification of classification of merchandise item registration, quantity change, or cancellation.

If the processor 101 in the transaction processing device 100 completes the check-in processing, the processing proceeds to ACT 12.

In ACT 12, the processor 101 checks whether the change in the transaction content is requested. If the change is not requested, the processor 101 determines NO and the processing proceeds to ACT 13. In ACT 13, the processor 101 checks whether a payment start is requested. If the payment start is not requested, the processor 101 determines NO and the processing returns to ACT 12. Thus, in ACT 12 and ACT 13, the processor 101 waits for the change or the payment start to be requested. If the change is requested from the cart terminal 400 as described above, the processor 101 determines YES in ACT 12 and the processing proceeds to ACT 14.

In ACT 14, the processor 101 updates the transaction data DAA according to the request. That is, for example, if the merchandise item registration is requested, the processor 101 adds, to the transaction data DAA, a field in which merchandise data related to the merchandise item to be newly registered is set. For example, if the quantity change is requested, the processor 101 finds the merchandise data related to the target transaction merchandise item from the merchandise data already included in the transaction data DAA, and rewrites the quantity indicated by the merchandise data. For example, if the cancellation is requested, the processor 101 finds the merchandise data related to the target transaction merchandise item from the merchandise data already included in the transaction data DAA, and deletes the merchandise data.

In ACT 15, the processor 101 determines a virtual input situation of each registered transaction merchandise item. The virtual input situation indicates a virtual situation (position) of each registered transaction merchandise item in the shopping basket. For example, according to the following rules, the processor 101 determines a situation indicating how the registered transaction merchandise item was placed in the shopping basket. The shape and size of the accommodation space of the shopping basket are determined in advance. The shopping basket to be used may be different for each store. In this case, the shape and the size of the accommodation space of the shopping basket are set for each store.

1) In the registration order of the transaction merchandise items, the corresponding virtual objects having the sizes indicated in the attribute database related to the transaction merchandise items are placed in the virtual shopping basket in a predetermined placement pattern.

2) As for the placement pattern, a stacking priority pattern and a plane priority pattern can be selectively applied. In the stacking priority pattern, a new virtual object is stacked on the virtual object already placed in the shopping basket, and if the virtual objects are stacked up to a predetermined upper limit height, a new virtual object is placed in a horizontal direction with respect to the virtual object already placed on the bottom surface. In the plane priority pattern, a new virtual object is placed side by side in the horizontal direction with respect to the virtual object already placed on the bottom surface of the shopping basket, and if there is no space to place a new object, the new virtual object is placed on the virtual object already placed with priority given to a lower position.

3) Next, a placement position of a new virtual object determined by the above placement pattern is adjusted in consideration of an attribute of the corresponding transaction merchandise item and an attribute of the transaction merchandise item corresponding to the virtual object already placed around the determined placement position of the new virtual object. The "attribute of the corresponding transaction merchandise item" (i.e., the transaction merchandise item corresponding to the virtual object being placed) is simply referred to as "the attribute of the virtual object". In addition, in the following description, if it is necessary to distinguish between a newly placed virtual object and an already placed virtual object, the objects may be referred to as an "additional object" and an "existing object", respectively.

3-1) If an attribute of an additional object is not "soft" and an attribute of the existing object located below the placement position of the additional object determined by the above placement pattern is "soft", the placement positions of the existing object and the additional object are replaced.

3-2) The virtual object whose attribute is "hard" is placed on the bottom surface of the basket.

3-3) If an attribute of an additional object is "hard" and an attribute of the existing object located below the placement position of the additional object determined by the above placement pattern is not "hard", the placement positions of the existing object and the additional object are replaced.

3-4) If an attribute of the existing object located around the placement position determined by the placement pattern with respect to an additional object is "refrigerated" or "frozen" and an attribute of the additional object is "high temperature", or vice versa, the placement position of the additional object is changed.

3-5) The virtual object related to the transaction merchandise item whose attribute is "excluded" is excluded from placement. That is, the merchandise item determined as an exclusion target in advance is not taken into consideration in calculation of an occupancy rate, which will be described later.

In ACT 16, the processor 101 calculates the occupancy rate as a ratio of the transaction merchandise items in the accommodation space of the shopping basket in the virtual input situation calculated as described above. For example, the processor 101 determines a contour of a transaction merchandise item group in the virtual input situation and calculates a volume within the contour. Further, for example, the processor 101 calculates the occupancy rate as a ratio of the calculated volume to a volume of the accommodation space of the shopping basket. Thus, the occupancy rate calculated here is an example of a degree of occupancy of the registered transaction merchandise items in the accommodation space of the shopping basket as a container.

In ACT 17, the processor 101 updates a monitoring screen displayed on the touch panel 304 of the attendant terminal 300. Then, the processor 101 returns to a waiting state in ACT 12 and ACT 13, and thereafter repeats ACT 14 to ACT 17 every time the change request is performed. In the calculation of the virtual input situation in ACT 15, the processor 101 may restart the calculation from the beginning based on the transaction data DAA updated immediately before, or may calculate the virtual input situation based on the transaction data DAA updated immediately before by storing the previously calculated virtual input situation and correcting the virtual input situation according to an updated content of the transaction data DAA immediately before.

Figure 9:
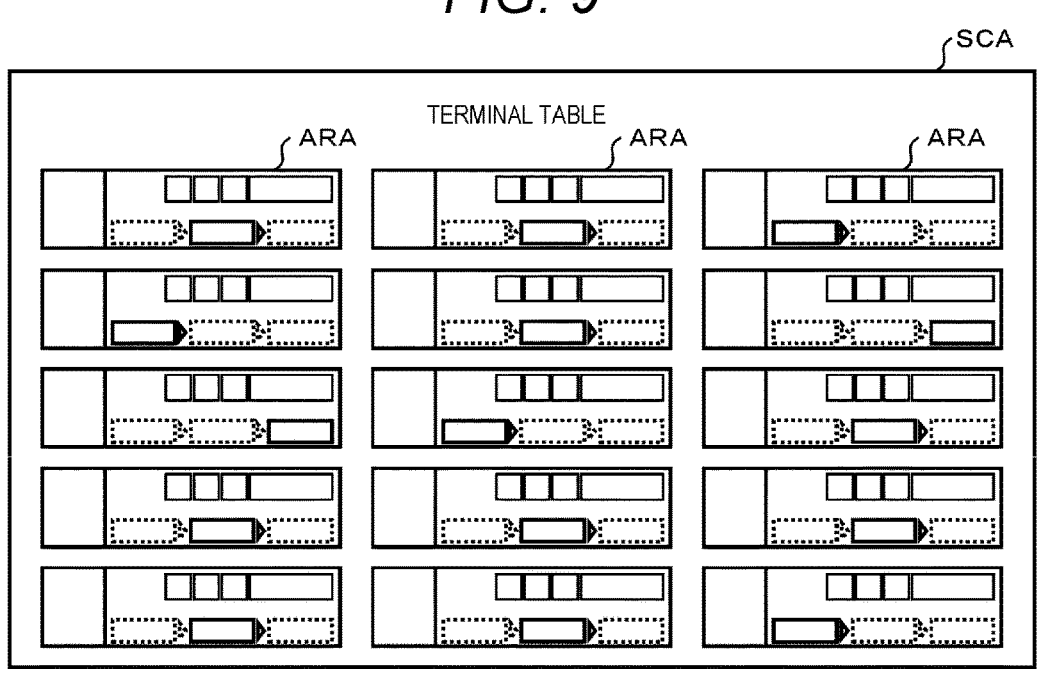
FIG. 9 is a schematic diagram of an example of an entire monitoring screen.

FIG. 9 is a schematic diagram of an example of an entire monitoring screen SCA. The monitoring screen SCA includes display areas ARA associated with the respective cart terminals 400 being checked in. Each display area ARA indicates a status of the transaction being executed for the associated cart terminal 400. The monitoring screen SCA can display operation situations of up to 15 cart terminals 400 at a time, and displays the display areas ARA associated with the cart terminals 400 in operation. Therefore, the number of display areas ARA included in the monitoring screen SCA may be less than that in the state shown in FIG. 9.

Figure 10:
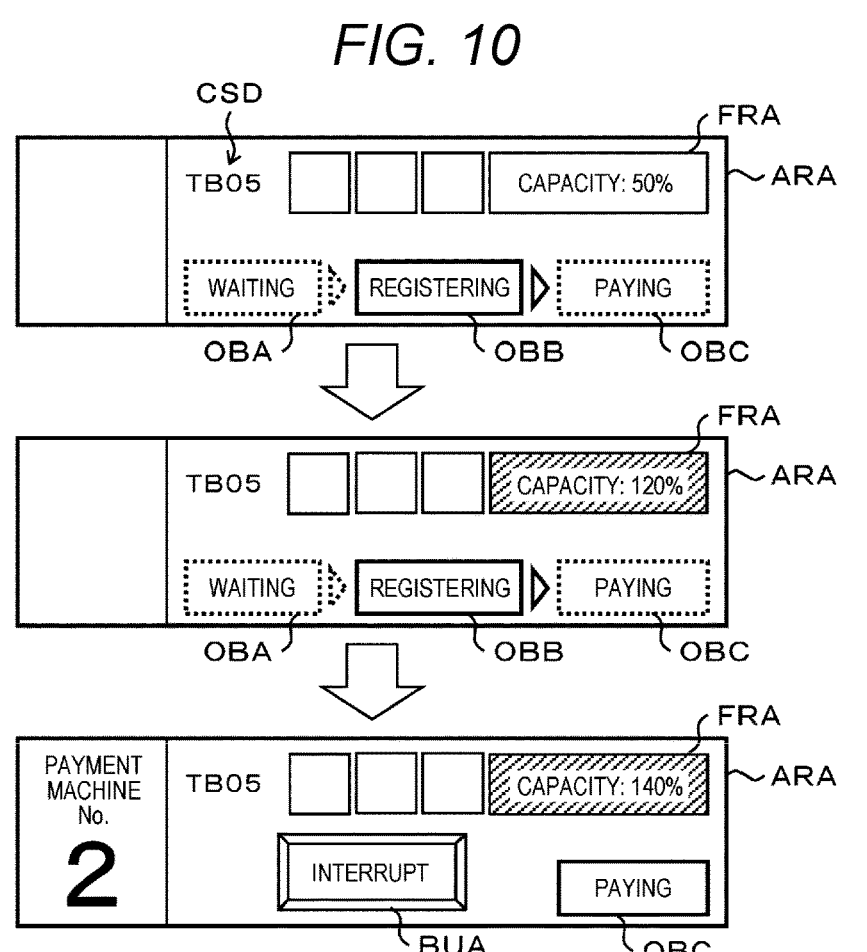
FIG. 10 is a diagram showing details of one display area of the entire monitoring screen.

FIG. 10 is a diagram showing details of one display area ARA in FIG. 9. FIG. 10 shows an example of transition of display in one display area ARA. The upper and middle parts of FIG. 10 show the case in which merchandise items are being registered at the associated cart terminal 400. The lower part of FIG. 10 shows a case in which the transaction is already shifted to the payment processing to be described later.

A character string CSD, a framework FRA, and display objects OBA, OBB, and OBC are disposed in the display area ARA associated with each cart terminal 400 in which merchandise items are being registered. The character string CSD indicates the terminal code of the cart terminal 400. The area surrounded by the frame FRA indicates an occupancy rate of the transaction merchandise items in the shopping basket. The display objects OBA, OBB, and OBC are associated with respective states of "waiting", "registering", and "paying". Any one of the display objects OBA, OBB, and OBC is in an active state, and the remaining two are in a non-active state. In FIG. 10, frames of the display object in the active state are indicated by a solid line, and frames of the display objects in the non-active state are indicated by broken lines. The non-active state is assumed to be, for example, a gray out display. The display object OBA is set to the active state before the merchandise registration related to the transaction is started. The display object OBB is set to the active state while the merchandise registration related to the transaction is being performed. The display object OBC is set to the active state during payment for the registered merchandise items.

The processor 301 in the attendant terminal 300 controls the touch panel 304 to display, for example, a character string "capacity: 50%" as shown in the upper part of FIG. 10 in the frame FRA of the display area ARA associated with the cart terminal 400 whose occupancy rate is 50%. In addition, for example, the processor 301 controls the touch panel 304 to highlights the inside of the frame line FRA of the display area ARA associated with the cart terminal 400 whose occupancy rate exceeds a predetermined threshold value as in the middle part of FIG. 10. The middle part of FIG. 10 shows an example in which the highlight-display is performed by making a background color inside the frame FRA different from the upper part of FIG. 10. The highlight-display may change a color, a thickness, a line type, or the like of the frame FRA, or may change a color, a size, a font, or the like of the character string shown in the frame FRA.

The monitoring screen SCA may be generated by the processor 101 in the transaction processing device 100, transmitted to the attendant terminal 300, and displayed on the touch panel 304 under the control of the processor 301. Alternatively, the processor 301 in the attendant terminal 300 may generate the monitoring screen SCA after acquiring various kinds of information from the transaction processing device 100.

The processor 101 controls the communication unit 104 to output the information indicating the occupancy rate to the attendant terminal 300 in order for the attendant terminal 300 to display the monitoring screen SCA.

The background color is made different as described above depending on whether the condition that "the occupancy rate exceeds a predetermined threshold value" is satisfied. To achieve this, if the condition is satisfied, the processor 101 controls the communication unit 104 to output information indicating the predetermined background color.

Based on the display in the display area ARA shown in the upper part of FIG. 10, the attendant can recognize that the merchandise registration is performed by the associated cart terminal 400 and that about half of the shopping basket is occupied by the registered transaction merchandise items.

Based on the display in the display area ARA shown in the middle part of FIG. 10, the attendant can recognize that the merchandise registration is performed by the associated cart terminal 400 and that attention is required because the registered transaction merchandise items protrude from the shopping basket. For example, based on such recognition, the attendant can search for the customer who has a shopping basket under the situation, and provide a customer service by handing over a new shopping basket.

If the occupancy rate exceeds the predetermined threshold value, such as 120%, the processor 101 may instruct the cart terminal 400 to display a guidance screen on the touch panel 404 for prompting the customer to add a shopping basket.

Figure 11:
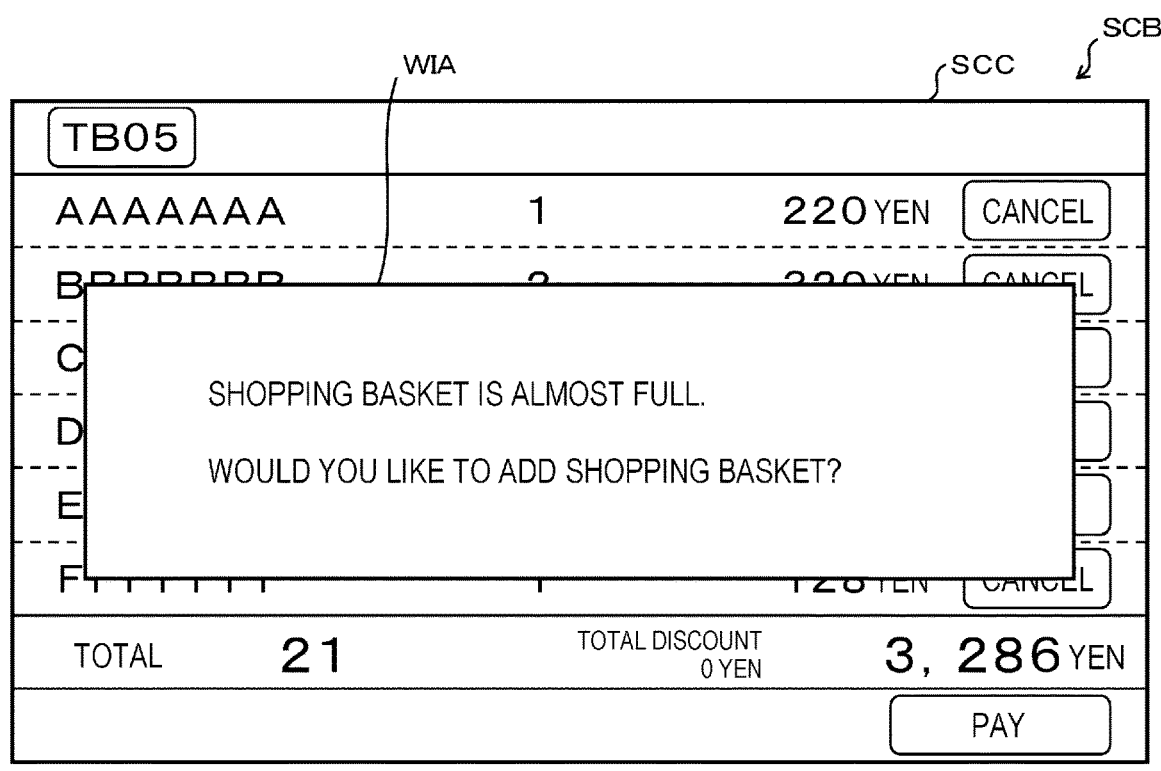
FIG. 11 is a diagram showing an example of a guidance screen.

FIG. 11 is a diagram showing an example of a guidance screen SCB. The guidance screen SCB is a screen in which a window WIA is superimposed on a registration screen SCC indicating the registration state of each transaction merchandise item. The window WIA indicates a text message for prompting the customer to add a shopping basket.

In this way, when instructing the cart terminal 400 to display the guidance screen SCB, the processor 101 controls the communication unit 104 to output predetermined information such as a "text message for prompting the customer to add a shopping basket" if a predetermined condition such as "if the predetermined threshold value is exceeded" is satisfied.

After completing the registration of the transaction merchandise items, the customer performs a predetermined operation on the cart terminal 400 to instruct the start of payment. Accordingly, the processor 401 in the cart terminal 400 requests the transaction processing device 100 to start the payment. According to the request, the processor 101 in the transaction processing device 100 determines YES in ACT 13 in FIG. 7, and the processing proceeds to ACT 21 in FIG. 8.

In ACT 21, the processor 101 instructs the cart terminal 400 to display a payment screen. The payment screen is a screen for the payment machine 200 to take over the payment processing related to the transaction. The payment screen displays a bar code indicating information for the payment machine 200 to make an inquiry for the transaction to the transaction processing device 100. After receiving the instruction, the processor 401 of the cart terminal 400 controls the touch panel 404 to display the payment screen.

If a plurality of the payment machines 200 are installed in the store, the customer freely selects one of the payment machines 200 not in use, and uses a bar code scanner provided in the payment machine 200 to read the bar code displayed on the payment screen. Accordingly, the payment machine 200 requests payment data from the transaction processing device 100 based on information indicated by the bar code read by the bar code scanner.

The processor 101 in the transaction processing device 100 instructs the display of the payment screen in ACT 21, and then the processing proceeds to ACT 22. In ACT 22, the processor 101 waits for the payment data to be requested. If the request from the payment machine 200 as described above is the payment data related to the transaction to be processed, the processor 101 determines YES and the processing proceeds to ACT 23. In ACT 23, the processor 101 controls the communication unit 104 to transmit, to the payment machine 200, which is a request source, the payment data for causing the payment machine 200 to settle the requested transaction.

In this way, according to the payment data transmitted from the transaction processing device 100, the payment machine 200 executes processing for the payment of the transaction based on the payment data while appropriately displaying the screen and receiving the operation of the customer related to the payment. The processing of the payment machine 200 may be, for example, processing similar to processing executed by a payment machine of an existing POS system. The payment is to calculate a price and settle the price.

Regarding the take-over of the payment processing related to the transaction from the cart terminal 400 to the payment machine 200, in addition to the above, for example, if the cart terminal 400 approaches the identified payment machine 200, the take-over may be performed by transferring the payment data by the wireless communication. If the payment machine 200 is in a form of a gate, if the cart terminal 400 approaches the gate, the payment data related to the transaction may be transferred.

If the processor 101 in the transaction processing device 100 completes transmitting the payment data in ACT 23, the processing proceeds to ACT 24. In ACT 24, the processor 101 updates the monitoring screen displayed on the touch panel 304 of the attendant terminal 300. That is, the processor 101 updates the monitoring screen so that the display area ARA associated with the target transaction is displayed as shown in the lower part of FIG. 10.

The display area ARA shown in the lower part of FIG. 10 indicates, through the associated cart terminal 400, that the payment processing is being performed using the payment machine 200 identified by a number "No. 2". Further, the display area ARA indicates that the occupancy rate calculated when ACT 16 in FIG. 7 is executed last before the payment start is instructed is 140%. A button BUA is displayed in the display area ARA. The button BUA is a soft key for receiving an interruption instruction of the payment processing operated by the attendant.

For example, if the attendant recognizes that the processing is shifted to the payment processing by the payment machine 200 due to the display such as the display area ARA shown in the lower part of FIG. 10, the attendant visually checks the shopping basket carried by the customer to the payment machine 200. Then, the attendant refers to the occupancy rate displayed on the monitoring screen, and if there is a suspicion that an error regarding the merchandise items in the shopping basket occurs, the attendant instructs to interrupt the payment processing by a predetermined operation such as tapping the button BUA. Then, the processor 301 in the attendant terminal 300 requests the transaction processing device 100 to interrupt the payment processing.

The processor 101 in the transaction processing device 100 updates the monitoring screen in ACT 24 in FIG. 8, and the processing proceeds to ACT 25. In ACT 25, the processor 101 checks whether the interruption of the transaction processing is requested. If the interruption is not requested, the processor 101 determines NO and the processing proceeds to ACT 26. In ACT 26, the processor 101 checks whether checking completion is notified. If checking completion is not notified, the processor 101 determines NO and returns to ACT 25. Thus, the processor 101 waits for the interruption request or the completion notification in ACT 25 and ACT 26. Then, if the interruption regarding the target transaction is requested from the attendant terminal 300 as described above, the processor 101 determines YES in ACT 25, and the processing proceeds to ACT 27.

In ACT 27, the processor 101 instructs the payment machine 200 to which the payment data is transmitted in ACT 23 to interrupt the payment processing. If the interruption is instructed from the transaction processing device 100 as described above, the payment machine 200 interrupts the payment processing. The payment machine 200 then displays an interruption screen on a display device provided in the payment machine 200.

Figure 12:
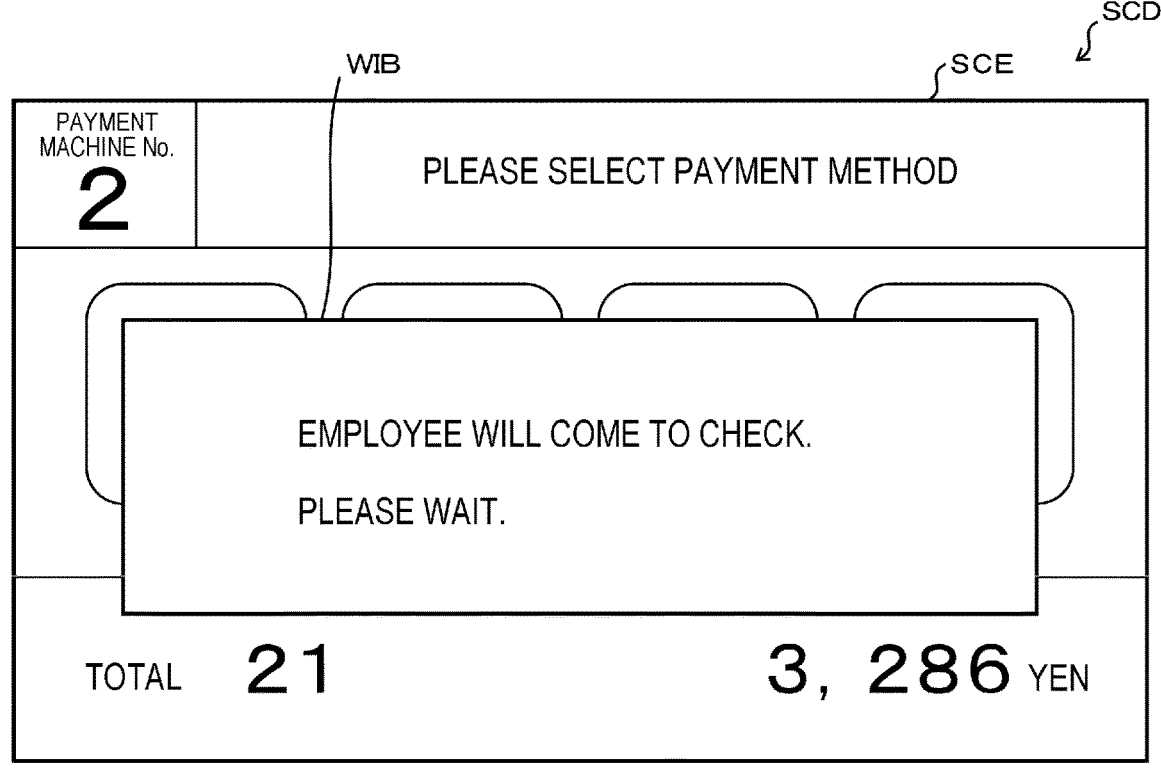
FIG. 12 is a diagram showing an example of an interruption screen.

FIG. 12 is a diagram showing an example of an interruption screen SCD. The interruption screen SCD is a screen in which a window WIB is superimposed on a screen SCE for allowing the customer to select a payment method. The window WIB indicates a text message for guiding the customer to wait for checking by an employee.

The attendant instructs the interruption of the payment processing as described above, goes to the payment machine 200, and checks the content of the shopping basket carried by the customer. If the attendant checks that there is no problem, the attendant performs a predetermined release operation on the payment machine 200. The release operation is, for example, an operation of causing the bar code scanner provided in the payment machine 200 to read a bar code displayed on an employee card. If the release operation is performed, the payment machine 200 requests the transaction processing device 100 to release the transaction.

Yet, such a checking operation by the attendant may make the customer uncomfortable. Therefore, it is possible to display a screen on the touch panel 404 at the start of use of the cart terminal 400 for guiding that checking by the store clerk may occur. The screen display may be autonomously performed by the processor 401, or may be performed according to an instruction from the processor 101 of the transaction processing device 100.

The processor 101 instructs the interruption in ACT 27 in FIG. 8, and then the processing proceeds to ACT 28. In ACT 28, the processor 101 waits for the release to be requested. If the release is requested from the payment machine 200 as described above, the processor 101 determines YES and the processing proceeds to ACT 29. Then, the processor 101 instructs the payment machine 200 which is the request source to resume the payment processing. Then, the processor 101 returns to the waiting state in ACT 25 and ACT 26. If the payment processing is completed, the payment machine 200 notifies the transaction processing device 100 of the completion. Accordingly, the processor 101 in the transaction processing device 100 determines YES in ACT 26, and ends the transaction processing.

As described above, in the transaction processing system 1, the transaction processing device 100 registers transaction merchandise items and calculates the occupancy rate thereof in the accommodation space of the shopping basket. The transaction processing device 100 allows the attendant to recognize the occupancy rate by displaying the occupancy rate on the attendant terminal 300. Accordingly, if there is a deviation between the occupancy rate that can be visually checked and the occupancy rate recognized from the display on the attendant terminal 300, the attendant can determine that there is a suspicion that the transaction merchandise item is not appropriately registered. In addition, it is possible to prevent an erroneous operation related to the registration of the transaction merchandise item from not being addressed by the attendant who performs the checking work.

The transaction processing device 100 sets the monitoring screen SCA as an operation screen for receiving the interruption instruction by displaying the button BUA, and, according to the interruption instruction, interrupts the payment processing in the payment machine 200 and does not perform the settlement. Accordingly, it is possible to reliably prevent the settlement from being performed until the attendant performs the checking work.

The transaction processing system 1 causes the cart terminal 400 to display the guidance screen SCB according to the instruction from the transaction processing device 100. If the customer additionally uses a new basket according to the guidance, it is possible to reduce the chance that the merchandise registration is continued while an actual occupancy rate of the transaction merchandise in the shopping basket is high. If the shopping basket is full of the transaction merchandise items, it is considered that there is a high risk that the transaction merchandise items which have been correctly registered cannot be put in the shopping basket, or the attendant hardly visually determines the occupancy rate. The guidance screen makes it possible to increase the chance of avoiding the above situations.

The embodiments described above can be modified in various manners as follows. A degree of occupancy of the transaction merchandise items in the accommodation space of the container is not limited to the one described above. For example, another numerical value may be set according to an empty state in the container if the transaction merchandise items are correctly accommodated in the container. For example, a volume occupied by the transaction merchandise items may be calculated as a sum of volumes of the transaction merchandise items without calculating the virtual input situation in ACT 15 in FIG. 7.

If a predetermined interruption condition is satisfied, the processor 101 may instruct the payment machine 200 to which the payment data is transmitted in ACT 23 in FIG. 8 to interrupt the payment processing without receiving the instruction given by the attendant. For example, the processor 101 may recognize the occupancy situation of each merchandise item in the shopping basket based on output data from a camera with a time of flight (TOF) sensor provided in the payment machine 200, and may instruct the interruption if the occupancy situation does not match the occupancy rate.

The transaction data DAA may be stored in the auxiliary storage unit 403 of the cart terminal 400, and the processor 401 may update the transaction data DAA.

A smartphone owned by the customer may be used instead of the cart terminal 400.

One or more of the functions performed by the processor 101 may also be performed by hardware t such as a logic circuit. The above-described functions may also be performed by software and hardware such as the logic circuit described above.

While certain embodiments are described, these embodiments are presented as examples and are not intended to limit the scope of the exemplary embodiments. These novel embodiments can be implemented in various other forms, and various omissions, substitutions, and changes can be made without departing from the spirit of the exemplary embodiments. The embodiments and the modification thereof are included in the scope and the spirit of the invention and are also included in the invention described in the scope of claims and an equivalent scope thereof.

What is claimed is:

1. A transaction processing system comprising:
a cart terminal attachable to a shopping cart on which a basket can be placed, the cart terminal being configured to start a sales transaction and register one or more merchandise items for purchase in association with the sales transaction;
an attendant terminal configured to generate a monitoring screen that shows a status of sales transactions started by the cart terminal and other cart terminals; and
a transaction processing device configured to:
    acquire information indicating at least a size of each of the registered merchandise items,
    generate in a virtual space one or more virtual objects corresponding to the registered merchandise items based on the acquired information, place the virtual objects in a virtual basket corresponding to the basket placed on the shopping cart according to a predetermined pattern and attributes of the merchandise items, and determine a degree of occupancy of the virtual objects in the virtual basket as a degree of occupancy of the registered merchandise items in the basket placed on the shopping cart, and
    output the determined degree of occupancy to the attendant terminal, wherein
the attendant terminal is further configured to, upon receipt of the degree of occupancy, update the monitoring screen to display the received degree of occupancy and in response to determining that the received degree of occupancy is greater than a threshold, highlight the status of the sales transaction started by the cart terminal in the monitoring screen.

2. The transaction processing system according to claim 1, further comprising:
a payment machine configured to perform payment processing on the registered merchandise items, wherein
the attendant terminal is configured to:
    display a selectable object for interrupting the payment processing on the monitoring screen, and
    upon selection of the object, transmit to the payment machine a command that interrupts the payment processing.

3. The transaction processing system according to claim 2, wherein the attendant terminal displays the screen indicating an identifier for each of the cart terminal and the payment machine.

4. The transaction processing system according to claim 2, wherein the payment machine is visible from an area where the attendant terminal is installed.

5. The transaction processing system according to claim 1, wherein the transaction processing device is configured to:
    determine whether each of the registered merchandise items is an exclusion target, and
    exclude one or more of the registered merchandise items determined to be an exclusion target from the determination of the degree of occupancy.

6. The transaction processing system according to claim 1, wherein the transaction processing device is configured to:
    determine whether the degree of occupancy exceeds a threshold, and
    output the degree of occupancy in different modes depending on whether the degree of occupancy exceeds the threshold.

7. The transaction processing system according to claim 6, wherein
    the attendant terminal displays the degree of occupancy with different background colors corresponding to the modes.

8. The transaction processing system according to claim 1, wherein the cart terminal is configured to acquire and display the degree of occupancy.

9. The transaction processing system according to claim 1, wherein
    the cart terminal is configured to transmit a check-in request to the transaction processing device before starting the registration of the merchandise items, and
    the transaction processing device is configured to accept the check-in request and then allow the cart terminal to register merchandise items.

10. A method performed by a transaction processing system including a cart terminal attachable to a shopping cart on which a basket can be placed, an attendant terminal, and a transaction processing device, the method comprising:
    by the cart terminal, starting a sales transaction and registering one or more merchandise items for purchase in association with the sales transaction;
    by the attendant terminal, generating a monitoring screen that shows a status of sales transactions started by the cart terminal and other cart terminals;
    by the transaction processing device, acquiring information indicating at least a size of each of the registered merchandise items;
    by the transaction processing device, generating in a virtual space one or more virtual objects corresponding to the registered merchandise items based on the acquired information, placing the virtual objects in a virtual basket corresponding to the basket placed on the shopping cart according to a predetermined pattern and attributes of the merchandise items, and determining a degree of occupancy of the virtual objects in the virtual basket as a degree of occupancy of the registered merchandise items in the basket placed on the shopping cart;
    by the transaction processing device, outputting the determined degree of occupancy to the attendant terminal; and
    by the attendant terminal, upon receipt of the degree of occupancy, updating the monitoring screen to display the received degree of occupancy, and in response to determining that the received degree of occupancy is greater than a threshold, highlighting the status of the sales transaction started by the cart terminal in the monitoring screen.

11. The method according to claim 10, further comprising:
    starting, by a payment machine, payment processing on the registered merchandise items;
    displaying, on the monitoring screen displayed by the attendant terminal, a selectable object for interrupting the payment processing; and

upon selection of the object, transmitting, from the attendant terminal to the payment machine, a command that interrupts the payment processing.

12. The method according to claim 11, wherein the screen indicates an identifier for each of the cart terminal and the payment machine.

13. The method according to claim 11, wherein the payment machine is visible from an area where the attendant terminal is installed.

14. The method according to claim 10, further comprising:

determining whether each of the registered merchandise items is an exclusion target, wherein determining the degree of occupancy includes excluding one or more of the registered merchandise items determined to be an exclusion target from the determination of the degree of occupancy.

15. The method according to claim 10, further comprising:

by the transaction processing device, determining whether the degree of occupancy exceeds a threshold, wherein the degree of occupancy is output in different modes depending on whether the degree of occupancy exceeds the threshold.

16. The method according to claim 15, wherein the degree of occupancy is displayed on an attendant terminal with different background colors corresponding to the modes.

17. The method according to claim 10, further comprising:

displaying the degree of occupancy on the cart terminal.

18. A transaction processing device comprising:

a network interface circuit connectable to a cart terminal used in a store and attachable to a shopping cart on which a basket can be placed, the network interface circuit being connectable to an attendant terminal configured to generate a monitoring screen showing a status of sales transactions started by the cart terminal and other cart terminals;

a memory that stores information indicating each of merchandise items sold in the store, the information indicating at least a size of said each of the merchandise items; and a processor configured to:

upon receipt of a request from the cart terminal, register one or more merchandise items for purchase in association with a sales transaction, generate in a virtual space one or more virtual objects corresponding to the registered merchandise items based on the acquired information, place the virtual objects in a virtual basket corresponding to the basket placed on the shopping cart according to a predetermined pattern and attributes of the merchandise items, and determine a degree of occupancy of the virtual objects in the virtual basket as a degree of occupancy of the registered merchandise items in the basket placed on the shopping cart, and control the network interface circuit to output the determined degree of occupancy to the attendant terminal, causing the attendant terminal to update the monitoring screen to display the degree of occupancy, and in response to determining that the received degree of occupancy is greater than a threshold, highlight the status of the sales transaction started by the cart terminal in the monitoring screen.

* * * * *